United States Patent
Izumi et al.

(10) Patent No.: US 10,242,763 B2
(45) Date of Patent: Mar. 26, 2019

(54) JOINED BODY, HONEYCOMB STRUCTURE, METHOD FOR PRODUCING JOINED BODY, AND COVERED BODY

(71) Applicant: NGK INSULATORS, LTD., Nagoya (JP)

(72) Inventors: Yunie Izumi, Nisshin (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 229 days.

(21) Appl. No.: 15/058,654

(22) Filed: Mar. 2, 2016

(65) Prior Publication Data

US 2016/0276054 A1    Sep. 22, 2016

(30) Foreign Application Priority Data

Mar. 20, 2015 (JP) .................. 2015-057671

(51) Int. Cl.
*B32B 15/04* (2006.01)
*B32B 17/06* (2006.01)
(Continued)

(52) U.S. Cl.
CPC ........... *H01B 1/16* (2013.01); *B01D 46/2418* (2013.01); *B32B 3/12* (2013.01); *B32B 7/12* (2013.01);
(Continued)

(58) Field of Classification Search
CPC ... C04B 35/00; C04B 37/026; C04B 38/0016; H01B 1/16; B32B 7/12; B32B 3/12;
(Continued)

(56) References Cited

U.S. PATENT DOCUMENTS 3,460,971 A * 8/1969 Bonis .................... C04B 41/009
                                                           427/404
4,529,494 A * 7/1985 Joo' .......................... C25C 3/12
                                                           204/268
(Continued)

FOREIGN PATENT DOCUMENTS

EP    0 182 128 A2    5/1986
EP    2 977 363 A1    1/2016
(Continued)

OTHER PUBLICATIONS

European Search Report, European Application No. 16159113.6, dated Aug. 2, 2016 (7 pages).
(Continued)

*Primary Examiner* — Lauren R Colgan
(74) *Attorney, Agent, or Firm* — Burr & Brown, PLLC (57) ABSTRACT

A joined body 20 includes a first member 22 having a thermal expansion coefficient of 8 ppm/K or less, a second member 24 having a thermal expansion coefficient of 12 ppm/K or more, and a joining portion 30 composed of an electrically conductive oxide containing 50% by mass or more of a spinel-type ferrite phase, the joining portion 30 joining the first member and the second member. The electrically conductive oxide preferably contains Fe and element A (where element A represents one or more selected from the group consisting of Mg, Mn, Co, Ni, Cu, and Zn). The molar ratio of element A to Fe, i.e., A/Fe, is 0.5 or less.

10 Claims, 4 Drawing Sheets

(51) Int. Cl.
  *H01B 1/16* (2006.01)
  *B32B 7/12* (2006.01)
  *B32B 3/12* (2006.01)
  *B32B 9/04* (2006.01)
  *B32B 15/16* (2006.01)
  *B32B 9/00* (2006.01)
  *B32B 37/06* (2006.01)
  *C04B 37/02* (2006.01)
  *C04B 38/00* (2006.01)
  *B01D 46/24* (2006.01)
  *C04B 111/00* (2006.01)

(52) U.S. Cl.
  CPC .............. *B32B 9/005* (2013.01); *B32B 9/048* (2013.01); *B32B 15/16* (2013.01); *B32B 37/06* (2013.01); *C04B 37/026* (2013.01); *C04B 38/0016* (2013.01); *B32B 2264/102* (2013.01); *B32B 2264/104* (2013.01); *B32B 2264/105* (2013.01); *B32B 2264/12* (2013.01); *B32B 2305/024* (2013.01); *B32B 2307/202* (2013.01); *C04B 2111/00413* (2013.01); *C04B 2235/3206* (2013.01); *C04B 2235/3262* (2013.01); *C04B 2235/3275* (2013.01); *C04B 2235/3279* (2013.01); *C04B 2235/3281* (2013.01); *C04B 2235/3284* (2013.01); *C04B 2235/763* (2013.01); *C04B 2235/96* (2013.01); *C04B 2235/9607* (2013.01); *C04B 2237/06* (2013.01); *C04B 2237/58* (2013.01)

(58) Field of Classification Search
  CPC ......... B32B 9/048; B32B 15/16; B32B 9/005; B32B 37/06; B32B 2264/12; B32B 2264/102; B32B 2264/105; B32B 2264/104; B32B 2307/202; B32B 2305/02; B01D 46/2418
  USPC .......................................... 428/688, 701, 702
  See application file for complete search history.

(56) References Cited

U.S. PATENT DOCUMENTS

| | | | |
|---|---|---|---|
| 4,629,662 A | 12/1986 | Brownlow et al. | |
| 9,878,518 B2* | 1/2018 | Izumi | ....................... B32B 7/02 |
| 2003/0189241 A1* | 10/2003 | Kamada | .............. H01L 41/1876 257/632 |
| 2011/0111324 A1* | 5/2011 | Ohmori | ............... H01M 8/0282 429/495 |
| 2014/0023957 A1 | 1/2014 | Brandner et al. | |
| 2016/0002110 A1 | 1/2016 | Izumi et al. | |
| 2016/0046531 A1 | 2/2016 | Izumi et al. | |
| 2016/0096342 A1* | 4/2016 | Izumi | ..................... B32B 9/005 174/84 R |
| 2016/0096777 A1* | 4/2016 | Izumi | ..................... B32B 9/005 428/116 |
| 2016/0099089 A1* | 4/2016 | Izumi | ................. H01B 13/0016 428/213 |

FOREIGN PATENT DOCUMENTS

| | | |
|---|---|---|
| JP | S61-127857 A | 6/1986 |
| JP | 3891790 B2 | 3/2007 |
| WO | 2014/148534 A1 | 9/2014 |

OTHER PUBLICATIONS

Japanese Office Action (with English translation), Japanese Application No. 2015-057671, dated Jul. 31, 2018 (6 pages).

* cited by examiner

FIG. 6A
Front View

FIG. 6B
Plan View

FIG. 6C
Bottom Plan View

FIG. 7

JOINED BODY, HONEYCOMB STRUCTURE, METHOD FOR PRODUCING JOINED BODY, AND COVERED BODY

BACKGROUND OF THE INVENTION

1. Field of the Invention

The present invention relates to a joined body, a honeycomb structure, a method for producing the joined body, and a covered body.

2. Description of the Related Art

Hitherto, joined bodies including joining portions with electrical conductivity have been desired. As a joining material used for the production of a joined body, for example, a conductive joining material containing a nickel oxide powder, a nickel metal powder, an iron oxide powder, and a vehicle has been reported (see Patent Literature 1). In Patent Literature 1, members are bonded with the conductive joining material and treated at 1000° C. or higher to join the members together.

CITATION LIST

Patent Literature

PTL 1: Japanese Patent No. 3891790

SUMMARY OF THE INVENTION

However, in the case where a joined body is produced with the joining material disclosed in Patent Literature 1, the joined body has low thermal cycle resistance, in some cases. For example, the joining strength and the electrical conductivity decrease with thermal cycles.

The present invention has been accomplished in order to overcome the foregoing problems. It is a main object of the present invention to provide a novel joined body which includes a joining portion with electrical conductivity and which has better thermal cycle resistance and a method for producing the joined body.

To achieve the foregoing main object, the inventors have conducted intensive studies and have found that when a member having a thermal expansion coefficient of 8 ppm/K or less and a member having a thermal expansion coefficient of 12 ppm/K or more are joined together with an electrically conductive oxide containing 50% by mass or more of a spinel-type ferrite phase, the resulting joined body has better thermal cycle resistance.

A joined body of the present invention includes:
a first member having a thermal expansion coefficient of 8 ppm/K or less,
a second member having a thermal expansion coefficient of 12 ppm/K or more, and
a joining portion composed of an electrically conductive oxide containing 50% by mass or more of a spinel-type ferrite phase, the joining portion joining the first member and the second member.

A honeycomb structure of the present invention includes the joined body described above.

A method for producing a joined body according to the present invention includes a step of:
firing a laminate to form a joining portion, the laminate including a first member having a thermal expansion coefficient of 8 ppm/K or less, a second member having a thermal expansion coefficient of 12 ppm/K or more, and an electrically conductive oxide raw material arranged between the first member and the second member, the joining portion being composed of an electrically conductive oxide containing 50% by mass or more of a spinel-type ferrite phase, and the joining portion joining the first member and the second member.

A covered body of the present invention includes:
a base, and
a covering portion composed of as electrically conductive oxide containing 50% by mass or more of a spinel-type ferrite phase, a difference in thermal expansion coefficient between the base and the covering portion being 8 ppm/K or less, and the covering portion being arranged so as to cover the whole or part of a surface of the base.

According to the joined body of the present invention and the method for producing the joined body, it is possible to provide a novel joined body which includes a joining portion with electrical conductivity and which has better thermal cycle resistance. The reason for this is preferably that, for example, the thermal expansion coefficient of the electrically conductive oxide which is contained in the joining portion and which contains 50% by mass or more of the spinel-type ferrite phase is intermediate between those of the first member and the second member, so that a thermal stress generated in the joined body is relieved, thereby further enhancing the thermal cycle resistance.

DETAILED DESCRIPTION OF THE INVENTION

Figure 1:
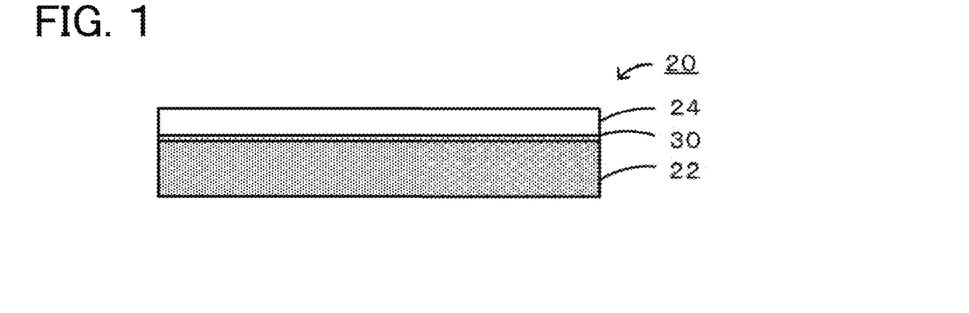
FIG. 1 is an explanatory drawing illustrating an example of a schematic structure of a joined body 20.

Embodiments of the present invention will be described below with reference to the drawings. FIG. 1 is an explanatory drawing of an example of a schematic structure of a joined body 20 according to an embodiment of the present invention. The joined body 20 includes a first member 22, a second member 24, and a joining portion 30 that joins the first member 22 and the second member 24 as illustrated in FIG. 1. Each of the first member 22 and the second member 24 may be composed of a porous material or a dense material. The joined body 20 may be a body in which a porous material and a porous material are joined together, a body in which a porous material and a dense material are joined together, or a body in which a dense material and a dense material are joined together.

The first member 22 has a thermal expansion coefficient of 8 ppm/K or less and preferably 6.0 ppm/K or less. The lower limit of the thermal expansion coefficient is not particularly limited and is preferably 1.0 ppm/K or more and more preferably 3.0 ppm/K or more. A difference in thermal expansion coefficient between the first member 22 and the joining portion 30 is preferably 8 ppm/K or less and more preferably 4 ppm/K or less. The thermal expansion coefficient is defined as a value at 800° C. with respect to a reference temperature of 40° C. when measurement is performed from room temperature to 1000° C. (the same shall apply hereinafter).

As a member having a thermal expansion coefficient of 8 ppm/K or less, for example, a ceramic member may be preferably used. The first member may be composed of a porous ceramic or a dense ceramic.

The porous ceramic is not particularly limited as long as it is a ceramic with a porous structure having open pores on its surfaces. For example, the porous structure may have a porosity of 10% by volume or more, preferably 20% by volume or more, and more preferably 40% by volume or more. In view of simple prediction, the porosity is preferably 90% by volume or less. The porosity of the porous ceramic may be appropriately selected, depending on, for example, the application. The porous ceramic preferably has an average pore diameter of, for example, 1 µm or more and 300 µm or less. In this range, an electrically conductive oxide contained in the joining portion penetrates easily into the pores in the porous ceramic, thereby resulting in firmer joining. The average pore diameter is preferably 5 µm or more and more preferably 10 or more. The average pore diameter is preferably 100 µm or less and more preferably 50 µm or less. The porosity and the average pore diameter of the porous ceramic indicate the results obtained from mercury intrusion porosimetry measurement.

The porous ceramic may be formed so as to contain at least one inorganic material selected from carbides, such as silicon carbide, titanium carbide, and boron carbide, nitrides, such as silicon nitride and aluminum nitride, oxynitrides, such as SIALON, zirconium phosphate, and so forth. Furthermore, the porous ceramic may be forced so as to contain at least one inorganic material selected from cordierite, mullite, zeolite, aluminum titanate, aluminum oxide, titanium oxide, silicon oxide, and so forth. The shape of the porous ceramic is not particularly limited and may be selected, depending on the application. Examples of the shape include plate shapes, cylindrical shapes, and honeycomb shapes. A shape having a structure through which fluid passes may also be used. Specifically, the porous ceramic preferably has a honeycomb structure including a partition portion configured to form a plurality of cells serving as passages of fluid. The porous ceramic may have electrical conductivity. In this case, the porous ceramic is preferably composed of a composite material containing SiC and Si, SiC being bonded with Si, pores being defined by SiC and Si. The Si-bonded SiC ceramic has electrical conductivity. For example, a metal member serving as an electrode can be joined thereto. In such a case, the application of the present invention has significance. The porous ceramic may be composed of a composite material ($Si_3N_4$-bonded SiC) containing SiC and $Si_3N_4$, SiC being bonded with $Si_3N_4$, pores being defined by SiC and $Si_3N_4$.

The dense ceramic is not particularly limited as long as it is composed of a dense ceramic material. The dense material may have a porosity of, for example, 5% by volume or less, preferably 1% by volume, and more preferably 0.5% by volume or less. Examples of the dense ceramic include a ceramic obtained by densely sintering any of the foregoing materials exemplified for the porous ceramic; a member produced by filling pores in porous ceramic with, for example, a filler or an impregnating material; and a composite oxide member containing a plurality of metals. Specific examples of the filled member include a Si-impregnated SiC sintered body in which pores of porous SiC are filled with metallic Si by impregnation. This material has good thermal conductivity and good electrical conductivity owing to Si.

The first member may be formed of such a ceramic member or a metal member which has a low thermal expansion coefficient and which is composed of, for example, Mo, Zr, Ta, W, Nb, Kovar (Ni—Co—Fe-based alloy), or Invar (Ni—Fe-based alloy). The shape of the metal member, may be appropriately selected depending on the application and may be, for example, a plate shape.

Among the foregoing materials, preferably, the first member 22 is composed of a ceramic containing Si or a metal member containing Fe. The ceramic containing Si and the metal member containing Fe have better joinability to an electrically conductive oxide containing 50% by mass or more of a spinel-type ferrite phase, for example, $ZnFe_2O_4$. As the ceramic containing Si, for example, SiC, Si-impregnated SiC, $Si_3N_4$, or $Si_3N_4$-bonded SiC is preferred. As the metal containing Fe, a Fe-based heat resistant alloy, for example, Kovar or Invar, is preferred.

The second member 24 preferably has a thermal expansion coefficient of 12 ppm/K or more. The upper limit of the thermal expansion coefficient is not particularly limited and is preferably 20 ppm/K or less and more preferably 18 ppm/K or less. A difference in thermal expansion coefficient between the second member 24 and the joining portion 30 is preferably 8 ppm/K or less and more preferably 6.5 ppm/K or less.

As a member having a thermal expansion coefficient of 12 ppm/K or more, for example, a metal member is preferably used. Examples of the metal member include members composed of metals, such as main-group metals and transition metals. For example, a metal member having high electrical conductivity is preferred. Among transition metals, a metal, for example, Fe, Co, Ni, or Cu, or alloys thereof is preferred. A noble metal, for example, Au or Ag, may be used, depending on the application. The metal member may serve as an electrode. In this case, stainless steel, for example, a Cr—Ni—Fe-based alloy (e.g., SUS304, SUS309, or SUS310) or a Cr—Fe-based alloy (e.g., SUS430), is preferably used. The metal member is preferably composed of an alloy containing at least Fe and Cr and more preferably an alloy at least containing 70% by mass or more and less than 90% by mass Fe and 10% by mass or more and less than 30% by mass Cr. This is because the material is stable and has good electrical conductivity. The metal member may be composed of an Mn-containing material, for example, SUS304, SUS303, SUS310, SUS430, or Hastelloy. In this case, Mn diffuses continuously in the joining portion to enhance the joinability. Kovar exemplified as the first member contains Mn and should have the effect of enhancing the joinability. The shape of the metal member may be appropriately selected depending on the application and may be, for example, a plate shape.

The second member 24 may be composed of such a metal member or a ceramic member having a high thermal expansion coefficient. As the ceramic member having a high thermal expansion coefficient, for example, magnesium oxide, calcium oxide, or boron nitride may be used. Furthermore, as the ceramic member having a high thermal expansion coefficient, for example, a composite oxide member composed of a $LaCrO_3$-based material, a $LaMnO_3$-based material, a $LaCoO_3$-based material, or $LaNiO_3$-based material may be used. The term "based material" is used to indicate that the material includes, for example, a material partially substituted with an alkali metal element, an alkaline-earth metal, or an element different in valence. Specifically, the LaMnO$_3$-based material includes, for example, (La$_{0.9}$Sr$_{0.1}$)MnO$_3$. These materials may be used as materials for fuel cells (for example, SOFC), thermoelectric elements, sensors, and the like. The shape of the ceramic member may be appropriately selected depending on the application and may be, for example, a plate shape.

Among the foregoing members, the second member 24 is preferably formed of a metal member containing Fe. The metal member containing Fe has better joinability to the joining portion 30 composed of an electrically conductive oxide containing a spinel-type ferrite phase, for example, an electrically conductive oxide containing ZnFe$_2$O$_4$. As an alloy containing iron, an iron-based alloy, such as stainless steel (SUS), or a Ni-based heat resistant alloy (Ni-based alloy), such as Inconel (Ni—Cr-based alloy) and Hastelloy (Ni—Fe—Mn-based alloy), is more preferred.

In the first member 22 and the second member 24, which are targets to be joined together, a difference in thermal expansion coefficient therebetween may be 4.0 ppm/K or more, 5.0 ppm/K or more, or 6.0 ppm/K or more. Even in the case of a joined body in which members having a relatively large difference in thermal expansion coefficient therebetween are joined together, a joining portion composed of an oxide ceramic permits the joining strength and the electrical conductivity to be maintained. In particular, also in the case of a joined body used under repeated heating, the joining strength and the electrical conductivity are maintained. For example, a Cr—Ni—Fe-based alloy (SUS304) has a thermal expansion coefficient of 18 ppm/K. A Cr—Fe-based alloy (SUS430) has a thermal expansion coefficient of 12 ppm/K. A Si-bonded SiC sintered body has a thermal expansion coefficient of 4.5 ppm/K. LaCrO$_3$ has a thermal expansion coefficient of 9.4 ppm/K.

The joining portion 30 is composed of an electrically conductive oxide containing 50% by mass or more of a spinel-type ferrite phase and joins the first member 22 and the second member 24. In the joining portion 30, the electrically conductive oxide seemingly contributes to the electrical conductivity to increase the electrical conductivity. In many cases, such electrically conductive oxides have thermal expansion coefficients of 8 ppm/K or more and 12 ppm/K or less, the thermal expansion coefficient being intermediate between those of the first member 22 and the second member 24. This seemingly relieves a thermal stress generated in the joined body 20, thereby enhancing the thermal cycle resistance.

The spinel-type ferrite is not particularly limited and may be represented by, for example, general formula AFe$_2$O$_4$ (where element A represents one or more selected from the group consisting of Mg, Mn, Co, Ni, Cu, and Zn). The term "general formula" is used to indicate that the elemental composition may vary and another element may be contained. The spinel-type ferrite is preferably one or more selected from the group consisting of ZnFe$_2$O$_4$, CuFe$_2$O$_4$, and MnFe$_2$O$_4$ and is more preferably ZnFe$_2$O$_4$.

The electrically conductive oxide more preferably contains Fe and element A (where element A represents one or more selected from the group consisting of Mg, Mn, Co, Ni, Cu, and Zn). In the electrically conductive oxide, the molar ratio of element A to Fe, i.e., A/Fe, is preferably 0.5 or less. The thermal expansion coefficient of the joining portion can be controlled by incorporating an iron oxide phase (Fe$_2$O$_4$) in the electrically conductive oxide in addition to the spinel-type ferrite phase (AFe$_2$O), so that various members can be joined. The value of A/Fe is preferably 0.25 or more from the viewpoint of increasing the joining strength after a thermal cycle. The value of A/Fe is preferably 0.4 or less from the viewpoint of increasing the electrical conductivity after the thermal cycle.

The electrically conductive oxide preferably contains the spinel-type ferrite phase in the range of 50% by mass or more and 100% by mass or less and more preferably in the range of 65% by mass or more and 100% by mass or less. The electrically conductive oxide preferably contains less than 50% by mass of the iron oxide phase and more preferably 35% by mass or less of the iron oxide phase. The electrically conductive oxide may contain an oxide phase other than the spinel-type ferrite phase or the iron oxide phase. The proportions of these phases in the electrically conductive oxide are values determined by calculation from the X-ray diffraction pattern of a surface of the joining portion 30 using a reference intensity ratio (RIR) method. For the measurement, a rotating anode X-ray diffractometer (RINT, manufactured by Rigaku Corporation) may be used.

The joining portion 30 preferably has a porosity of 90% by volume or less, more preferably 50% by volume or less, and still more preferably 30% by volume or less. The joining portion 30 is more preferably composed of a dense material in view of the electrical conductivity and the joining strength. The joining portion 30 preferably has a porosity of 5% by volume or more, more preferably 10% by volume or more, and still more preferably 20% by volume or more. The joining portion 30 more preferably has pores in view of stress relaxation. A method for calculating the porosity of the joining portion will be described. A microstructure image captured by a SEM is subjected to image analysis using image analysis software to determine the porosity of the joining portion. A portion having an area of $0.5 \times 10^{-6}$ m$^2$ of the joining portion is randomly selected and binarized to distinguish between images of pores and the electrically conductive oxide. Conditions of the binarization are appropriately set, depending on the resulting image. For example, values obtained empirically are used. In the binarized image, the pores and the electrically conductive oxide are separated, and the area ratio thereof is calculated to determine the porosity. The area ratio in a cross section is assumed to be almost equivalent to the volume ratio, and thus the porosity (% by volume) is obtained.

In the case where at least one of the first member 22 and the second member 24 is composed of a porous material, the joining portion 30 may penetrate into pores of the porous material. The joining portion 30 having a structure that penetrates the pores of the porous material is preferred because the joining strength is further increased.

The joining portion 30 preferably has a thermal expansion coefficient of 8 ppm/K or more and 12 ppm/K or less. A thermal expansion coefficient of 10 ppm/K or less results in higher joining strength even after repeating a thermal cycle and thus is preferred. A thermal expansion coefficient of 9.5 ppm/K or more results in higher electrical conductivity and thus is preferred.

The joining portion 30 preferably has an electrical conductivity of $1.0 \times 10^{-6}$ S/cm or more, more preferably $1.0 \times 10^{-4}$ S/cm or more, and still more preferably $1.0 \times 10^{-2}$ S/cm or more. The joining portion having higher electrical conductivity has superior electrical conductivity, thus leading to efficient use of electricity. The upper limit of the electrical conductivity will be about 100 S/cm in consideration of the material composition. The electrical conductivity of the joining portion 30 is preferably within the foregoing range before a thermal cycle and more preferably within the foregoing range even after the thermal cycle. The electrical conductivity is measured by a two-terminal method using a measurement sample in which electrodes are baked on the joining portion 30 of the joined body 20.

In the joined body 20, the joining strength between the first member 22 and the second member 24 is preferably 1.5 MPa or more. The joining strength is measured by a tensile test (complying with JIS R 1606). The joining strength is more preferably 3.0 MPa or more and still more preferably 5.0 MPa or more. Higher joining strength results in firmer joining to increase the reliability and thus is preferred. The adhesion strength between the first member 22 and the joining portion 30 and the adhesion strength between the second member 24 and the joining portion 30 are presumed to be at least equal to or higher than the joining strength between the first member 22 and the second member 24.

Figure 2:
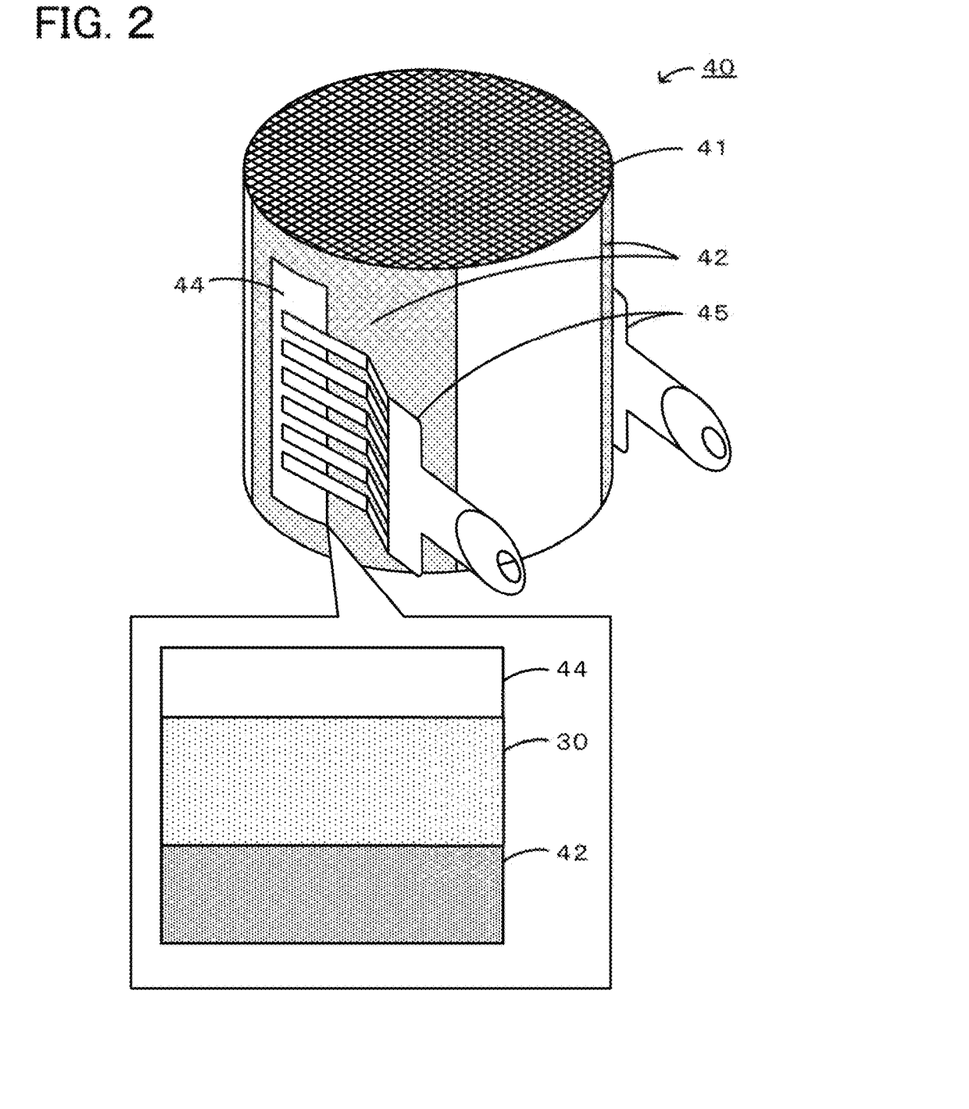
FIG. 2 is an explanatory drawing illustrating a honeycomb structure 40 serving as an example of the joined body 20.

The joined body according to this embodiment is not particularly limited as long as it has a structure in which the first member and the second member are joined together. The joined body may be used for, for example, honeycomb structures, thermoelectric elements, ceramic heaters, gas sensors for the detection of oxygen, NOx, and other gases, and fuel cells. For example, in the case of a honeycomb structure, the joined body may be preferably used to heat the honeycomb structure by the application of a voltage to the metal member. FIG. 2 is an explanatory drawing illustrating a honeycomb structure 40 which is an example of the joined body 20 and which is a honeycomb structure according to an embodiment of the present invention. The honeycomb structure 40 is configured to apply a voltage to electrode terminals 45 to heat a honeycomb base 41. The honeycomb structure 40 includes the honeycomb base 41, highly electrically conductive porous portions 42 having higher electrical conductivity than that of the honeycomb base 41, each of the highly electrically conductive porous portions 42 corresponding to the first member 22; metal electrodes 44 joined to the highly electrically conductive porous portions 42, each of the metal electrodes 44 corresponding to the second member 24; and the electrode terminals 45 corrected to the metal electrodes 44. As with the joined body 20 illustrated in FIG. 1, the joining portion 30 is composed of an electrically conductive oxide containing 50% by mass or more of a spinel-type ferrite phase and joins the highly electrically conductive porous portions 42 and the metal electrodes 44. A difference in electrical conductivity between the honeycomb base 41 and the highly electrically conductive porous portions 42 may be attributed to a difference in metal content therebetween. For example, in the case where the honeycomb structure is composed of a Si-bonded SiC ceramic, the highly electrically conductive porous portions 42 may have a higher Si content.

A method for producing a joined body according to this embodiment will be described below. The method for producing a joined body according to this embodiment may include, for example, (A) a base formation step of forming a first member and a second member and (B) a joining step of forming a joining portion (composed of the foregoing electrically conductive oxide) between the first member and the second member to join the first member and the second member. When the first member and the second member are separately prepared, the base formation step (A) may be emitted.

(A) Base Formation Step

In this step, the base is formed. For example, in the case where the first member and the second member are composed of a porous ceramic or a dense ceramic, the base may be formed by mixing raw materials together, molding the resulting mixture by a predetermined molding method, and firing the resulting molded article. The porous ceramic may be formed so as to contain one or more inorganic materials selected from, for example, carbides, such as silicon carbide, titanium carbide, and boron carbide, nitrides, such as silicon nitride and aluminum nitride, oxynitrides, such as SIALON, and zirconium phosphate. The porous ceramic may be formed so as to contain one or more inorganic materials selected from, for example, cordierite, mullite, zeolite, aluminum titanate, aluminum oxide, titanium oxide, silicon oxide, and magnesium oxide. In this step, for example, an inorganic material serving as an aggregate, a pore-forming material, and a dispersion medium are mixed to prepare a clay body or a slurry. In this case, a raw material composition is preferably adjusted in such a manner that the porosity and the average pore diameter of the porous ceramic are in the ranges described above, that is, for example, a porosity of 10% by volume or more and an average pore diameter of 1 to 300 µm. In this step, a treatment for filling pores of the porous ceramic with an impregnating material by impregnation may be performed to form the first member and the second member. The impregnation treatment may be performed by, for example, forming an impregnating base on the porous ceramic and performing heating at a temperature at which the impregnating base is melted. In the case where the porous ceramic is formed of a Si-bonded SiC sintered body, the impregnating material may be metallic Si.

In this step, in the case where the first member and the second member are metallic members, each of the members may be processed into a predetermined shape. The metal members are not particularly limited as long as they are composed of a metal, for example, a main-group metal or a transition metal. For example, a highly electrically conductive metal is preferred. Among transition metals, a metal, for example, Fe, Co, Ni, or Cu, or an alloy thereof is preferred. A noble metal, for example, Au or Ag, may be used, depending on the application. The metal members may be processed into, for example, a plate shape.

The first member formed in this step has a thermal expansion coefficient of 8 ppm/K or less. The second member formed in this step has a thermal expansion coefficient of 12 ppm/K or more. A difference in thermal expansion coefficient between the first member and the second member may be 6 ppm/K or more. Even in the case of a joined body in which members having a relatively large difference in thermal expansion coefficient therebetween are joined together, a joining portion composed of an oxide ceramic permits the joining strength and the electrical conductivity to be maintained. In particular, also in the case of a joined body used under repeated heating, the joining strength and the electrical conductivity are maintained.

Regarding the base formation step, for example, the case where a Si-bonded SiC ceramic (composite material) is formed as the porous ceramic will be specifically described. In this case, for example, a plastic clay body may be formed by mixing a SiC powder and a Si powder together in a predetermined volume ratio, adding a dispersion medium, such as water, a pore-forming material, and an organic binder thereto, and kneading the mixture. As the pore-forming material, a material to be burned off during firing is preferred. For example, starch, coke, or a foaming resin may be used. As the binder, for example, an organic binder, such as a cellulose-based material, is preferably used. As a dispersant, a surfactant, such as ethylene glycol, may be used. For example, the porous ceramic may be formed into a honeycomb formed article having a freely-selected shape as described above by extrusion molding with a mold including a plurality of cells juxtaposed. The resulting honeycomb formed article is preferably subjected to drying treatment, calcination treatment, and firing treatment. The calcination treatment is a treatment in which an organic component contained in the honeycomb formed article is removed by combustion at a temperature lower than a firing temperature. The firing temperature may be 1400° C. or higher and 1500° C. or lower and preferably 1430° C. or higher and 1450° C. or lower. A firing atmosphere is not particularly limited. An inert atmosphere is preferred. An Ar atmosphere is more preferred. The honeycomb base (Si-bonded SiC ceramic) sintered body can be obtained through the steps described above.

(B) Joining Step

In this step, joining treatment for joining the first member and the second member with the joining portion is performed. The first member and the second member may be freely selected from the foregoing members. The joining step may include, for example, (B-1) a laminate production substep of arranging a raw material for a joining portion between the first member and the second member to produce a laminate, and (B-2) a firing substep of firing the laminate. In the case where the laminate including the raw material arranged between the first member and the second member is separately prepared, the laminate production substep (B-1) may be omitted.

(B-1) Laminate Production Substep

In this substep, the raw material for the joining portion is arranged between the first member and the second member to produce the laminate. The raw material for the joining portion contains a raw material of an electrically conductive oxide (electrically conductive oxide raw material) containing a spinel-type ferrite phase. The electrically conductive oxide ram material may contain a spinel-type ferrite itself, may contain one or more of a metal (an elemental metal or an alloy) containing a metal element for constituting the spinel-type ferrite and a compound containing a metal element for constituting the spinel-type ferrite, or may contain both of them. Of these, the electrically conductive oxide raw material more preferably contains a metal powder and a compound powder. In the following firing substep, the synthesis of a spinel-type ferrite and the joining of the first member and the second member with the electrically conductive oxide containing 50% by mass or more of a spinel-type ferrite phase can be simultaneously performed, thereby reducing the process cast.

The electrically conductive oxide raw material preferably contains Fe and element A (where element A represents one or more selected from the group consisting of Mg, Mn, Co, Ni, Cu, and Zn). Fe and element A may be contained in the form of a metal or compound. The electrically conductive oxide raw material preferably contains Fe and element A in such a manner that the molar ratio of element A to Fe, i.e., A/Fe, is 0.5 or less and more preferably 0.25 or more and 0.4 or less.

The compound powder preferably contains one or more selected from the group consisting of oxide powders, carbonate powders, hydroxide powders, and chloride powders. The reason for this is that these compound powders react mildly with a metal powder, compared with nitrates and sulfates, thus resulting in good workability. Among those described above, an oxide powder and a carbonate powder are more preferred. The reason for this is as follow: Raw materials for these compound ponders are stably available at low cost. These compound powders react with a metal powder more mildly, thus resulting in better workability. The compound powder is a powder of a compound containing a metal element contained in the electrically conductive oxide of the joined body. The compound powder may be composed of a simple metal compound containing a single type of metal element or may be composed of a composite metal compound containing two or more types of metal elements. The metal element contained in the compound powder may be any one of metal elements contained in the electrically conductive oxide of the joined body. Among those metal elements, a metal element contained in the spinel-type ferrite is preferred. As the compound powder, for example, ZnO, $Zn_2P_2O_7$, $Zn(NO_3)_2.6H_2O$, or $ZnSO_4.7H_2O$ is preferred. In view of cost and ease of handling, ZnO is more preferred. As the compound powder, a powder of the spinel-type ferrite contained in the electrically conductive oxide of the joined body may also be used. In this case, however, a step of synthesizing the spinel-type ferrite is needed, thus reducing the production efficiency. As the compound powder, a powder of a metal oxide other than the spinel-type ferrite contained in the electrically conductive oxide of the joined body may be used. The compound powder preferably has an average particle diameter of, for example, 0.05 μm or more and 50 μm or less. In this range, an appropriate joining strength is easily obtained. The average particle diameter is preferably 0.1 μm or more and more preferably 0.5 μm or more. Furthermore, the average particle diameter is preferably 30 μm or less and more preferably 15 μm or less. The average particle diameter of the electrically conductive oxide raw material indicates a median diameter (D50) measured with a laser diffraction/scattering particle size distribution analyzer using water as a dispersion medium.

The metal powder is a powder of a metal containing a metal element contained in the electrically conductive oxide of the joined body. The metal powder may be composed of a simple metal containing a single type of metal element or may be composed of an alloy containing two or more types of metal elements. The metal element contained in the metal powder may be any one of metal elements contained in the electrically conductive oxide of the joined body. Among those metal elements, a metal element contained in the spinel-type ferrite is more preferred. As the metal element, for example, Fe or element A where element A represents one or more selected from the group consisting of Mg, Mn, Co, Ni, Cu, and Zn) is preferred. For example, Fe or Zn is more preferred. The metal powder preferably has an average particle diameter of, for example, 1 μm or more and 40 μm or less. In this range, an appropriate joining strength is easily obtained. An average particle diameter of 1 μm or more results in ease of handling because the reactivity is not too high. The average particle diameter is more preferably 3 μm or more. The average particle diameter is preferably 30 μm or less and more preferably 10 μm or less. For example, in the case where an electrically conductive oxide raw material containing metallic Fe and metallic Zn is used, the joining portion composed of a porous material is easily formed. The reason for this is presumably as follows: Zn is metal having a low-melting-point (melting point: about 420° C.). Thus, the oxidation of only a surface proceeds first. An inner portion is melted to form pores.

Preferable examples of the electrically conductive oxide raw material include a material containing a compound powder composed of ZnO and a metal powder composed of Fe; a material containing a compound powder composed of $Fe_2O_3$ and a metal powder composed of Zn; a material containing compound powders composed of ZnO and $Fe_2O_3$; and a material containing metal powders composed of Zn and Fe. The material containing a compound powder composed of ZnO and a metal powder composed of Fe is more preferred. In the case where such an electrically conductive oxide raw material powder is used, a joined body including a joining portion containing $ZnFe_2O_4$, which is a spinel-type ferrite, can be produced.

The raw material for the joining portion may contain, for example, a binder, a solvent, a dispersant, and a plasticizer, in addition to the electrically conductive oxide raw material, and may be formed into, for example, a slurry-, paste-, or clay-like material. As the binder, for example, polyvinyl butyral (PVB) may be preferably used. As the solvent, for example, terpineol may be preferably used.

A method for arranging the raw material between the first member and the second member to produce the laminate is not particularly limited. For example, the laminate may be formed by applying a slurry or paste containing the electrically conductive oxide raw material powder to one or both of the first member and the second member by an application method and then laminating the first member and the second member so as to sandwich a surface to which the slurry or paste has been applied. In this case, high adhesion of the first member and the second member to the joining portion is provided. Thus, for example, peeling at the joining portion is inhibited. The laminate may be formed by forming a molded article using an extrusion molding method with a clay-like material containing the electrically conductive oxide raw material powder and arranging the molded article between the first member and the second member. The laminate may be formed by arranging the electrically conductive oxide raw material powder alone between the first member and the second member and limiting the movement of the raw material powder with a frame or the like.

(B-2) Firing Substep

In this substep, the laminate is fired. In this substep, in the case where the electrically conductive oxide raw material contains the spinel-type ferrite, the spinel-type ferrite is sintered to form the spinel-type ferrite phase. In the case where the electrically conductive oxide raw material contains one or more of a metal and a compound thereof, the metal containing a metal element contained in the spinel-type ferrite, they are oxidized alone or in combination to form the spinel-type ferrite phase.

In this substep, the firing atmosphere may be an oxidizing atmosphere, for example, atmospheric air or an oxygen atmosphere, or an inert atmosphere (low-oxygen atmosphere), for example, a nitrogen atmosphere or an argon atmosphere. In this substep, the firing temperature may be set in a suitable range, depending on the materials of the first member, the second member, and the joining portion. The firing temperature may be 500° C. or higher and 1400° C. or lower. At 500° C. or higher, the spinel-type ferrite is more reliably synthesized. At 1400° C. or lower, for example, changes in the properties of the first member and the second member during firing can be further inhibited. The firing temperature is preferably 600° C. or higher, more preferably 700° C. or higher, and still more preferably 800° C. or higher. In the case where an electrically conductive joining material containing Fe and Zn is used, the lower limit of the firing temperature is preferably 500° C. or higher because a synthesis reaction and the oxidation of Fe and Zn proceed smoothly at 500° C. or higher. In the case where an electrically conductive joining material containing Fe and ZnO is used, the lower limit of the firing temperature is preferably 700° C. or higher because a synthesis reaction and the oxidation of Fe proceed smoothly at 700° C. or higher. The upper limit of the firing temperature is preferably 1400° C. or lower when the atmosphere is an inert atmosphere (low-oxygen atmosphere). The upper limit of the firing temperature is preferably 900° C. or lower when the firing atmosphere is an oxidizing atmosphere. The firing time is preferably 0.1 hours or more and more preferably 0.5 hours or more. The firing time is preferably 24 hours or less, more preferably 10 hours or less, and still more preferably 2 hours or less.

According to the joined body of this embodiment and the method for producing the joined body described above, it is possible to provide a novel joined body which includes a joining portion with electrical conductivity and which has better thermal cycle resistance. The reason for this is presumably that, for example, the thermal expansion coefficient of the electrically conductive oxide which is contained in the joining portion and which contains 50% by mass or more of the spinel-type ferrite phase is intermediate between those of the first member and the second member, so that a thermal stress generated in the joined body is relieved, thereby further increasing the thermal cycle resistance. In addition, for example, the electrically conductive oxide contained in the joining portion is an oxide ceramic; hence, even if the joining portion is exposed to high temperature in air or the like, changes in material quality and characteristics are less likely to occur. Furthermore, for example, the joining portion has electrical conductivity; hence, for example, when the first member and the second member each having electrical conductivity are used, the first member and the second member can be joined together in such a manner that a current can pass therethrough.

The present invention is not limited to the foregoing embodiments. It should be appreciated that the present invention can be implemented in various ways without departing from the technical scope of the present invention.

Figure 3:
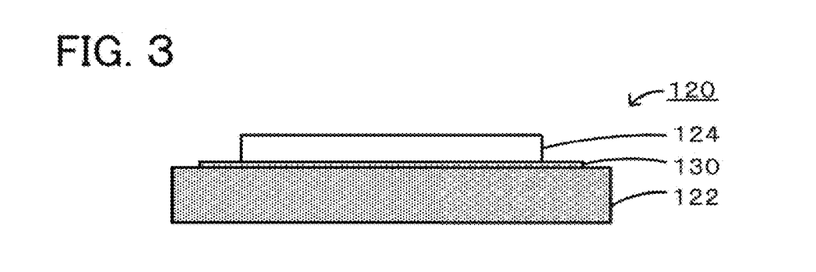
FIG. 3 is an explanatory drawing illustrating a schematic structure of a joined body 120.
Figure 4:
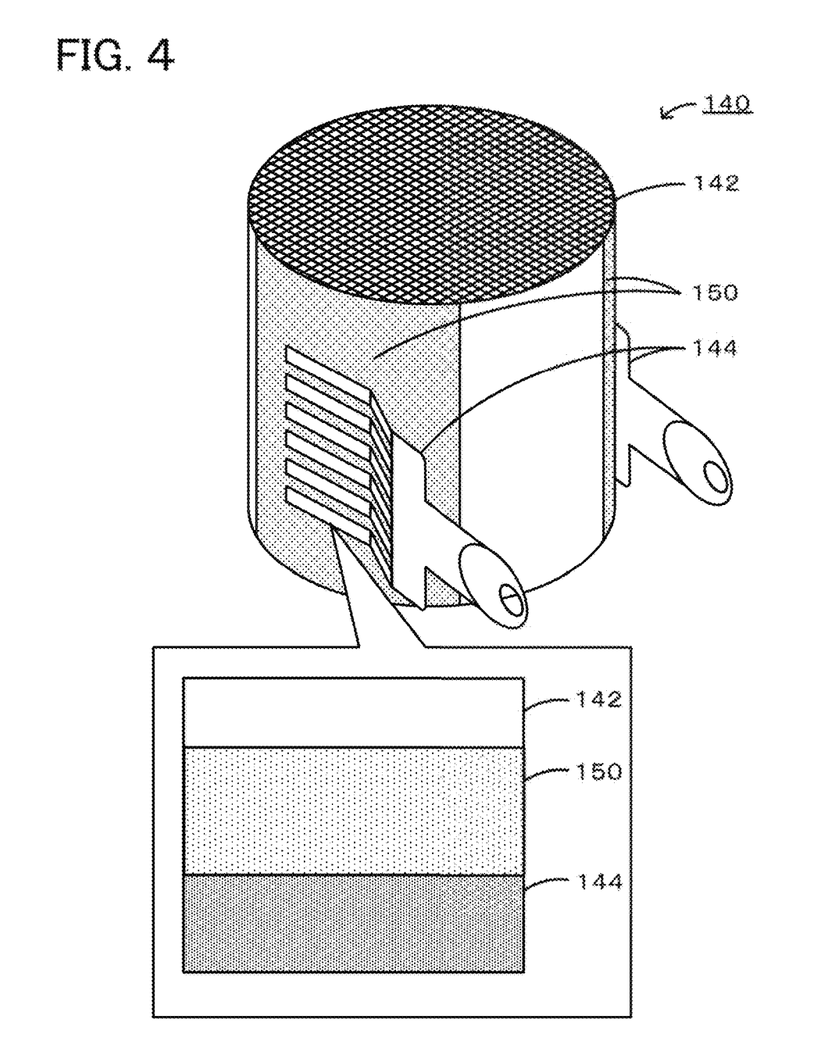
FIG. 4 is an explanatory drawing of a honeycomb structure 14 serving as an example of the joined body 120.

For example, in FIGS. 1 and 2, the joined body in which the first member, the second member, and the joining portion are not exposed has been mainly described. Part of the first member may be exposed. Part of the second member may be exposed. Part of the joining portion (at least one of part of a surface of the joining portion adjacent to the first member and part of a surface of the joining portion adjacent to the second member) may be exposed. Two or more of these parts may be exposed. For example, as illustrated in FIG. 3, a joined body 120 may be provided, the joined body 120 including a first member 122, a second member 124 joined to part of the first member 122, and a joining portion 130 joining the first member 122 and the second member 124. In the joined body 120, part of a surface of the first member 122 adjacent to the joining portion 130 is exposed. Part of a surface of the joining portion 130 adjacent to the second member 124 is exposed. FIG. 4 is an explanatory drawing illustrating the honeycomb structure 140 which is an example of the joined body and which is a honeycomb structure according to an embodiment of the present invention. The honeycomb structure 140 includes a honeycomb base 142 corresponding to the first member 122, an electrode terminals 144 each corresponding to the second member, and electrode portions 150 each corresponding to the joining portion 130. The honeycomb structure 140 is configured to heat the honeycomb base 142 by applying a voltage to the electrode terminals 144. As with the joined body 120 illustrated in FIG. 3, the electrode portions 150 are composed of an electrically conductive oxide containing 50% by mass or more of a spinel-type ferrite phase. The area of the second member may be larger than, smaller than, or equal to that of the joining portion. The area of the second member is preferably smaller than that of the joining portion.

Figure 5A:
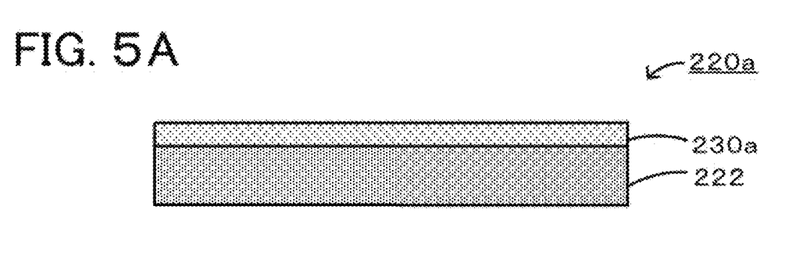
FIGS. 5A to 5D illustrate schematic structures of covered bodies 220a to 220d.
Figure 5B:
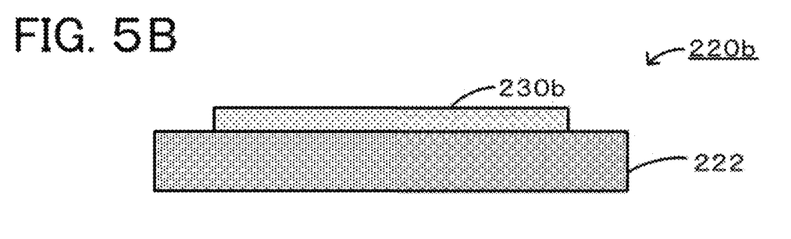
Figure 5C:
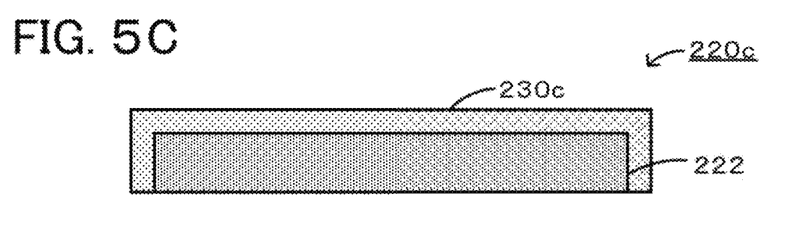
Figure 5D:
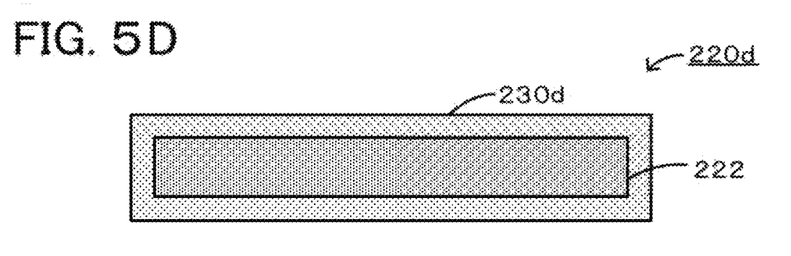

For example, while the joined bodies have been described in the foregoing embodiments, a covered body may be provided. The covered body includes a base; and a covering portion composed of an electrically conductive oxide containing 50% by mass or more of a spinel-type ferrite phase, a difference in thermal expansion coefficient between the base and the covering portion being 8 ppm/K or less, and the covering portion being arranged so as to cover the whole or part of a surface of the base. In the covered body, the electrically conductive oxide contained in the covering portion is an oxide ceramic; hence, even if the covered body is exposed to a high temperature in air or the like, changes in material quality and characteristics are less likely to occur. Furthermore, the covering portion has electrical conductivity; hence, for example, when the base having electrical conductivity is used, a current can pass through the base via the covering portion. As the covered body, for example, a covered body 220a including a covering portion 230a arranged so as to cover the whole of a predetermined surface of a base 222 may be provided (FIG. 5A). A covered body 220b including a covering portion 230b arranged so as to cover part of a predetermined surface of the base 222 may be provided (FIG. 5B). A covered body 220c including a covering portion 230c arranged so as to cover a plurality of surfaces of the base 222 may be provided (FIG. 5C). A covered body 220d including a covering portion 230d arranged so as to cover all surfaces of the base 222 may be provided (FIG. 5D). As with this covered body, also in the case of the foregoing joined body, the joining portion (electrically conductive oxide) may be arranged so as to cover the whole or part of a surface of the first member and the second member.

In this covered body, examples of the base include members exemplified as the first member and the second member in the foregoing joined body. Examples of a material of the covering portion include materials exemplified for the joining portion in the foregoing joined body. The covered body may be, for example, an article in which the first member or the second member of the joined body is omitted. In this case, the omitted member may be joined to the covering portion later by, for example, brazing. The covered body of the present invention may be, for example, a honeycomb structure. The covered body may be an article in which the metal electrodes 44 and the electrode terminals 45 are omitted from the honeycomb structure of FIG. 2. The covered body may be an article in which the electrode terminals 144 are omitted from the honeycomb structure of FIG. 4. For example, the covered body may be produced as in the method for producing the joined body, except, that in the laminate production substep of the method for producing the joined body, the laminate is produced toy arranging a raw material of the covering portion so as to cover the whole or part of a surface of the base, instead of producing the laminate by arranging the raw material of the joining portion between the first member and the second member. As the raw material of the covering portion, a material the same as the raw material of the joining portion may be used.

For example, while the honeycomb structures 40 and 140 have been described in the foregoing embodiments, the honeycomb structure of the present invention is not limited thereto. Any honeycomb structure will suffice as long as the joined body or the covered body is provided. An article including a honeycomb base serving as a base having a honeycomb structure and electrode portions arranged on the honeycomb base, the electrode portions being composed of an electrically conductive oxide, is preferred (for example, the honeycomb structure 140). In the case where such a honeycomb structure is used as an electrical heating catalyst carrier (EHC) in which a current passes through the electrode portions, the electrode portions composed of a predetermined electrically conductive oxide are present; hence, the occurrence of the nonuniform distribution of heat generated is inhibited to uniformly perform heating, thereby leading to good durability. The reason for this is presumably that the electrically conductive oxide containing 50% by mass or more of the spinel-type ferrite phase of the electrode portions is a material stable at a high temperature of 1000° C. or higher in air, exhibits only a small change in resistance, and inhibits the occurrence of the locally nonuniform distribution of heat generated.

EXAMPLES

Examples of the specific production of a joined body of the present invention will be described below as experimental examples. Experimental examples 1 to 9 correspond to the examples of the present invention. Experimental example 10 corresponds to a comparative example. It should be appreciated that the present invention is not limited to the following examples and can be implemented in numerous ways without departing from the technical scope of the present invention.

Production of Joined Body

Experimental Example 1 to 8

Figure 6A:
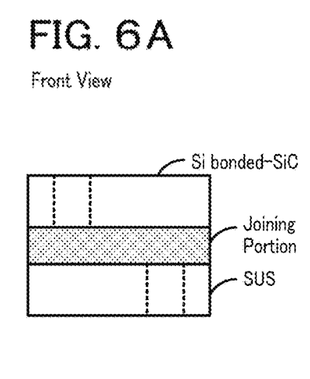
FIGS. 6A to 6C illustrate a joined body used in Experimental examples 1 to 8.
Figure 6B:
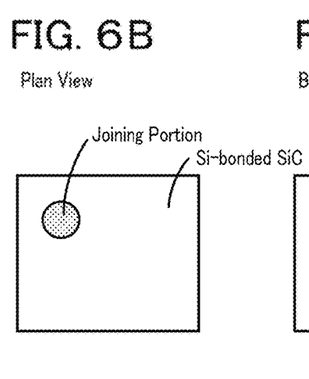
Figure 6C:
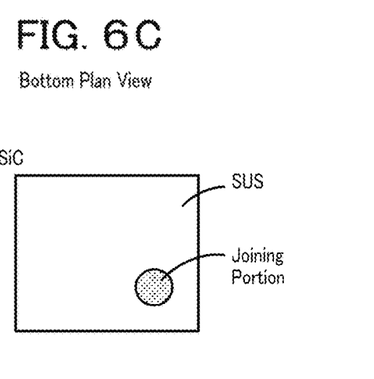

In Experimental examples 1 to 8, joined bodies each including a first member composed of Si-bonded SiC, a second member composed of SUS430, and a joining portion composed of an electrically conductive oxide containing $ZnFe_2O_4$ were produced. Specifically, an Fe powder (57.8% by mass) and a ZnO powder (42.2% by mass) were mixed together to prepare an electrically conductive oxide raw material powder. Then α-terpineol serving as a solvent and polyvinyl butyral (PVB) serving as a binder were added thereto. These materials were mixed together in a mortar to prepare a slurry. The resulting slurry was defoamed with a planetary centrifugal mixer and then applied to a member (metal member) composed of SUS (Cr—Fe-based alloy, SUS430) by printing. A member composed of Si-bonded SiC (porous ceramic) was arranged thereon to form a laminate. The laminate was dried in air at 80° C. for 4 hours while being pressed with an alumina plate arranged on the Si-bonded SiC member. The dry laminate was fired in air at 800° C. for 1 hour to produce a joined body of Experimental example 1. In the joined body, as illustrated in FIGS. 6A to 6C, the SUS member and the Si-bonded SiC member each having a hole with a diameter of 2 mm were used. The SUS member and the Si-bonded SiC member were joined together in such a manner that the holes were alternately arranged (the holes are not superimposed) and that parts of the joining portion were exposed.

A joined body of Experimental example 2 was produced as in Experimental example 1, except that an Fe powder (61.5% by mass) and a ZnO powder (38.5% by mass) were mixed together to prepare an electrically conductive oxide raw material powder. A joined body of Experimental example 3 was produced as in Experimental example 1, except that an Fe powder (65.4% by mass) and a ZnO powder (34.6% by mass) were mixed together to prepare an electrically conductive oxide raw material powder. A joined body of Experimental example 4 was produced as in Experimental example 1, except that an Fe powder (69.3% by mass) and a ZnO powder (30.7% by mass) were mixed together to prepare an electrically conductive oxide raw material powder. A joined body of Experimental example 5 was produced as in Experimental example 1, except that an Fe powder (77.4% by mass) and a ZnO powder (22.6% by mass) were mixed together to prepare an electrically conductive oxide raw material powder. A joined body of Experimental example 6 was produced as in Experimental example 1, except that an Fe powder (86.1% by mass) and a ZnO powder (13.9% by mass) were mixed together to prepare an electrically conductive oxide raw material powder. A joined body of Experimental example 7 was produced as in Experimental example 1, except that a Zn powder was used in place of the ZnO powder and that an Fe powder (73.7% by mass) and the Zn powder (26.3% by mass) were mixed together to prepare an electrically conductive oxide raw material powder. A joined body of Experimental example 8 was produced as in Experimental example 1, except that the electrically conductive oxide raw material powder was changed to a $ZnFe_2O_4$ powder, the firing atmosphere was chanced to Ar, and the firing temperature was changed to 1000° C. The $ZnFe_2O_4$ powder used in Experimental example 8 was synthesized as follows: First, $Fe_2O_3$ (76.3% by mass) and ZnO (23.7% by mass) were weighed. IPA serving as a solvent was added thereto. Mixing was performed for 4 hours by ball milling with iron-core nylon balls serving as grinding media. The resulting slurry was dried in a nitrogen atmosphere at 110° C. for 14 hours to prepare a mixed powder. The resulting powder was calcined in air at 1200° C. and then subjected to ball milling for 16 hours with IPA serving as a solvent and $ZrO_2$ balls serving as grinding media. The resulting slurry was dried in the same way as described above to prepare a $ZnFe_2O_4$ powder.

Experimental Example 9

In Experimental example 9, a joined body including a first member composed of Si-impregnated SiC, a second member composed of SUS304, and a joining portion composed of an electrically conductive oxide containing $ZnFe_2O_4$ was produced. Specifically, the joined body of Experimental example 9 was produced as in Experimental example 3, except that Si-impregnated SiC was used for the first member and that SUS304 was used for the second member.

Experimental Example 10

A joined body of Experimental example 10 was produced as in Experimental example 1, except that Ag solder was used in place of the electrically conductive oxide containing $ZnFe_2O_4$.

(Identification of Crystal Phase of Joining Portion)

The crystal phase of the joining portion of each of the joined bodies produced as described above was identified. The measurement was performed with a rotating anode X-ray diffractometer (RINT, manufactured by Rigaku Corporation). The metal member was removed from the joined body produced as described above to expose the joining portion. The resulting article was used as a measurement sample. An X-ray diffraction pattern of a surface of the joining portion was obtained. Conditions of the X-ray diffraction measurement were as follows: CuKα radiation source, 50 KV, 300 mA, and 2θ=20° to 60°. The resulting X-ray diffraction data thus obtained was analyzed using "X-ray data analysis software JADE 7" manufactured by MDI. The results demonstrated that each of the joining portions of Experimental examples 1 to 9 contained 50% by mass or more of a spinel-type ferrite phase.

(Proportion of Crystal Phase)

Figure 7:
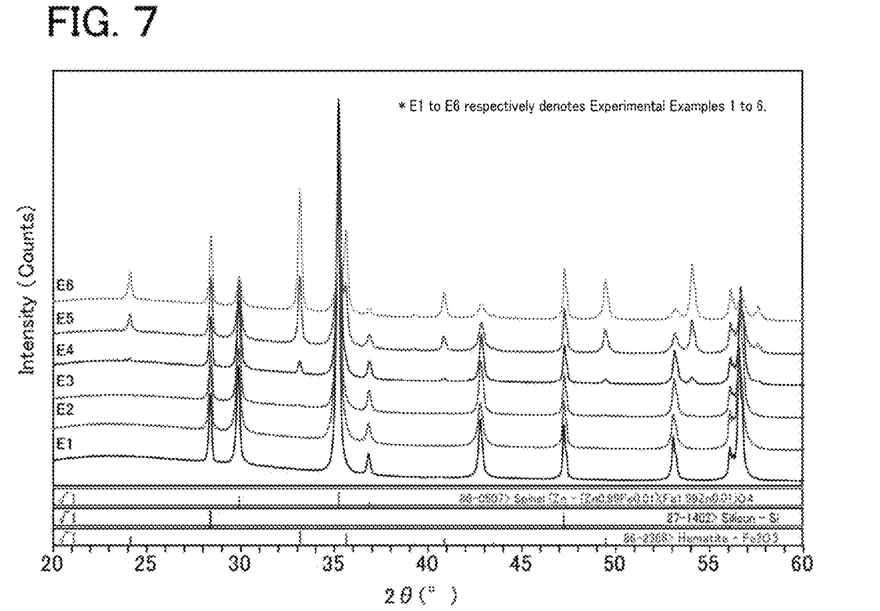
FIG. 7 is an X-ray diffraction pattern in Experimental examples 1, to 6.

The proportion of the crystal phase in each of the joined body produced as described above was analyzed. The measurement was performed with a rotating anode X-ray diffractometer (RINT, manufactured by Rigaku Corporation). The proportion of the crystal phase was calculated from the X-ray diffraction pattern of the surface of the joining portion using a reference intensity ratio (RIR) method. FIG. 7 illustrates the X-ray diffraction patterns of Experimental examples 1 to 6. In FIG. 7, diffraction peaks corresponding to Si are present and are attributed to Si serving as a reference substance added in order to measure the amount of peak shift. The amount of peak shift was defined as a value of the difference between the value of 2θ at the position of the diffraction peak corresponding to the (311) plane of $ZnFe_2O_4$, which is a spinel-type oxide, described in JCPDS card No. 22-1012 and the value of 2θ at the position of the diffraction peak corresponding to the (311) plane in the measured data. A calculation method is as follows: To adjust the displacement of a peak position attributed to the setting of the measurement sample and the apparatus, the peak position in the measured data was adjusted in such a manner that the diffraction peak position of the Si (111) plane described in JCPDS card No. 27-1402 coincided with the diffraction peak position of the Si (111) plane in the measured data. Thereafter, the diffraction between the value of 2θ at the position of the diffraction peak corresponding to the (311) plane of $ZnFe_2O_4$, which is a spinel-type oxide, described in JCPDS card No. 22-1012 and the value of 2θ at the position of the diffraction peak corresponding to the (311) plane in the measured data was calculated.

(Joinability)

The joinability of each of the joined bodies was evaluated by SEM observation of a cross section of each joined body. The joined body produced as described above was embedded in a resin and polished to a nearly specular surface with, for example, a diamond slurry, thereby producing an observation sample. The sample is then observed with a SEM at a magnification of ×1500 to check the delamination between the joining portion and each of the porous ceramic and the metal member and the occurrence of cracking in the porous ceramic, the metal member, and the joining portion. The evaluation was performed according to the following criteria. The case where none of the delamination or the occurrence of the cracking were observed was rated as "A (excellent)". The case where significant delamination or cracking was observed was rated as "F (failure)".

(Heat Resistance Test)

A heat resistance test was performed as described below. The joined bodies of Experimental examples 1 to 10 were subjected to heat treatment by heating the joined bodies to 800° C. in air and maintaining the temperature for 24 hours. After the heat treatment, a Ag paste (4922N, manufactured by du Pont) was applied to two portions of an exposed surface of each of the joining portions to form green terminals each having a diameter of 1.5 nm. The green terminals were dried to form electrode terminals. The electrode terminals of the measurement samples were energized to measure the electrical conductivity. A change in electrical conductivity before and after the heat treatment was evaluated.

(Joining Strength)

The joining strength of each of the joined bodies was evaluated by a tensile test (complying with JIS R1606). The case where the joining strength was 5.0 MPa or more was rated as "A (excellent)". The case where the joining strength was 3.0 MPa or more and less than 5.0 MPa was rated as "B (good)". The case where the joining strength was 1.5 MPa or more and less than 3.0 MPa was rated as "C (fair)". The case where the joining strength was less than 1.5 MPa was rated as "F (failure)". The evaluation of the joining strength was performed before and after the heat resistance test.

(Electrical Conductivity)

The electrical conductivity of the joining portion was evaluated as described below. The joined bodies of Experimental examples 1 to 10 were used. A Ag paste (4922N, manufactured by du Pant) was applied to two portions of an exposed surface of each of the joining portions to form green electrodes each having a diameter of 2 mm. The green electrodes were dried to form electrodes for the measurement of electrical conductivity. Terminals were pressed against the resulting measurement electrodes. An electrical resistance was measured by a direct-current two-terminal method. The volume resistivity r ($\Omega$cm) was calculated from the expression r=R×S/L where R represents a measured electrical resistance ($\Omega$), S represents the area of the measurement electrode (cm$^2$), and L represents an interelectrode distance (cm). The electrical conductivity $\rho$ (Scm$^{-1}$) of the electrode portions was calculated from the expression $\rho$=1/R. The evaluation of fee electrical conductivity was performed before and after the foregoing heat resistance test.

Comprehensive Evaluation)

The comprehensive evaluation of each of the samples was performed on the basis of the foregoing measurement results. In this comprehensive evaluation, the case where the joining strength after the thermal cycle was rated as "A" and where the electrical conductivity after the thermal cycle was 1.0×10$^{-3}$ S/cm or more was rated as "A (excellent)". The case where the joining strength after the thermal cycle was rated as "A" and where the electrical conductivity after the thermal cycle was less than 1.0×10$^{-3}$ S/cm and the case where the joining strength after the thermal cycle was rated as "B" and where the electrical conductivity after the thermal cycle was 1.0×10$^{-3}$ S/cm or more was rated as "B (good)". The case where the joining strength after the thermal cycle was rated as "B" and where the electrical conductivity after the thermal cycle was less than 1.0×10$^{-3}$ S/cm was rated as "C (fair)". The case where the joining strength after the thermal cycle was rated as "F" was rated as "F (failure)".

[Experimental Result]

Regarding the joined bodies of Experimental examples 1 to 10, Table 1 lists the proportions of the raw materials fed, the Zn/Fe ratio, the material and the thermal expansion coefficient of the first member, the material and the thermal expansion coefficient of the second member, the firing atmosphere, and the firing temperature. Table 2 lists the joinability, the joining strength before and after the heat resistance test, the electrical conductivity of the joining portion before and after the heat resistance test, and the comprehensive evaluation. As listed in Tables 1 and 2, in each of Experimental examples 1 to 9, in which the joining portions composed of the electrically conductive oxide containing the spinel-type ferrite phase were included, the comprehensive evaluation was rated as "A" to "C", which was satisfactory. In contrast, in Experimental example 10, in which the Ag solder was used for the joining portion, the thermal cycle resistance was low, and the comprehensive evaluation was rated as "F".

TABLE 1

| | Proportion of Raw Material (mass %) | | | | Molar Ratio | First Member | | Second Member | | Firing | Firing Temperature |
|---|---|---|---|---|---|---|---|---|---|---|---|
| | Fe | ZnO | ZnFe$_2$O$_4$ | Zn | Zn/Fe | Material | CTE | Material | CTE | Atmosphere | (° C.) |
| Experimental Example 1 | 57.8 | 42.2 | 0.0 | 0.0 | 0.50 | Si-bonded SiC | 4.6 | SUS430 | 12.0 | Air | 800 |
| Experimental Example 2 | 61.5 | 38.5 | 0.0 | 0.0 | 0.43 | Si-bonded SiC | 4.6 | SUS430 | 12.0 | Air | 800 |
| Experimental Example 3 | 65.4 | 34.6 | 0.0 | 0.0 | 0.36 | Si-bonded SiC | 4.6 | SUS430 | 12.0 | Air | 800 |
| Experimental Example 4 | 69.3 | 30.7 | 0.0 | 0.0 | 0.30 | Si-bonded SiC | 4.6 | SUS430 | 12.0 | Air | 800 |
| Experimental Example 5 | 77.4 | 22.6 | 0.0 | 0.0 | 0.20 | Si-bonded SiC | 4.6 | SUS430 | 12.0 | Air | 800 |
| Experimental Example 6 | 86.1 | 13.9 | 0.0 | 0.0 | 0.11 | Si-bonded SiC | 4.6 | SUS430 | 12.0 | Air | 800 |
| Experimental Example 7 | 73.7 | 0.0 | 0.0 | 26.3 | 0.30 | Si-bonded SiC | 4.6 | SUS430 | 12.0 | Air | 800 |
| Experimental Example 8 | 0.0 | 0.0 | 100.0 | 0.0 | 0.30 | Si-bonded SiC | 4.6 | SUS430 | 12.0 | Ar | 1000 |
| Experimental Example 9 | 65.4 | 34.6 | 0.0 | 0.0 | 0.36 | Si-impregnated SiC | 4.5 | SUS304 | 16.0 | Air | 800 |
| Experimental Example 10 | Ag Brazing 100 wt % | | | | — | Si-bonded SiC | 4.6 | SUS430 | 12.0 | Air | 800 |

TABLE 2

| | Proportion of Crystal Phase (mass %) | | Amount of Peak Shift (°) | Thermal Expansion Coefficient of Joining Material (ppm/K) | Joinability[1] | Joining Strength[2] | | Electrical Conductivity of Joining Portion | | Comprehensive Evaluation[3] |
|---|---|---|---|---|---|---|---|---|---|---|
| | ZnFe$_2$O$_4$ | Fe$_2$O$_3$ | | | | Before Thermal Cycle | After Thermal Cycle | Before Thermal Cycle | After Thermal Cycle | |
| Experimental Example 1 | 100 | 0 | 0 | 9.1 | A | A | A | 6.7E−06 | 6.7E−06 | B |
| Experimental Example 2 | 100 | 0 | <0.01 | 9.2 | A | A | A | 8.0E−02 | 6.6E−05 | B |
| Experimental Example 3 | 100 | 0 | <0.01 | 9.7 | A | A | A | 2.9E−01 | 1.1E−03 | A |
| Experimental Example 4 | 100 | 0 | 0.019 | 10.0 | A | A | A | 4.2E−01 | 2.2E−03 | A |
| Experimental Example 5 | 68.9 | 31.1 | 0.020 | 10.7 | A | A | B | 1.3E−01 | 9.8E−04 | C |
| Experimental Example 6 | 66.9 | 33.1 | 0.022 | 11.3 | A | A | B | 1.7E−02 | 2.5E−04 | C |

TABLE 2-continued

|  | Proportion of Crystal Phase (mass %) | | Amount of Peak Shift (°) | Thermal Expansion Coefficient of Joining Material (ppm/K) | Joinability[1] | Joining Strength[2] | | Electrical Conductivity of Joining Portion | | Comprehensive Evaluation[3] |
|---|---|---|---|---|---|---|---|---|---|---|
|  | ZnFe$_2$O$_4$ | Fe$_2$O$_3$ |  |  |  | Before Thermal Cycle | After Thermal Cycle | Before Thermal Cycle | After Thermal Cycle |  |
| Experimental Example 7 | 100 | 0 | 0.020 | — | A | A | A | 3.0E−01 | 2.0E−03 | A |
| Experimental Example 8 | 100 | 0 | 0.018 | — | A | B | B | 3.8E−01 | 2.1E−03 | B |
| Experimental Example 9 | 100 | 0 | <0.01 | 9.7 | A | A | A | 3.0E−01 | 1.2E−03 | A |
| Experimental Example 10 | — | — | — | 19.0 | A | A | F | 4.2E−01 | 6.7E−06 | F |

[1] A: excellent, F: failure
[2] A: 5.0 MPa or more, B: 3.0 MPa or more and less than 5.0 MPa, C: 1.5 MPa or more and less than 3.0 MPa, F: less than 1.5 MPa
[3] A: excellent, B: good, C: fair, F: failure We shall discuss the electrically conductive oxide raw material. In each of Experimental examples 1 to 7 and 9, in which the raw materials before synthesis were used, the joined body had high joining strength and was produced at a low firing temperature, compared with Experimental example 8, in which the synthesized spinel-type ferrite was used. The reason for this is presumably as follows: For example, the metals (Fe and Zn) expand at the time of oxidation. Part of the joining portion penetrates into the pores of the porous material (first member). As a result, the porous material and the joining portion are mechanically fitted together and thus are more firmly joined together. In the case where the joining portion is formed in association with the synthesis reaction of Fe and ZnO or Zn, the reason is presumably that the mass transfer is relatively high, and that the solid-phase diffusion into Si-bonded SiC (first member) and SUS (second member) occurs easily, thereby resulting in firmer joining between the joining portion and the target members. The results described above demonstrated that as the electrically conductive oxide raw material, the raw material before synthesis was preferred. Examples of the raw material include a raw material containing a metal that contains a metal element contained in a spinel-type ferrite and a compound that contains a metal element contained in a spinel-type ferrite; and a raw material containing two or more metals that include a metal element contained in a spinel-type ferrite. In Experimental example 4, in which the raw material contained the metal and the compound, the electrical conductivity was high, compared with Experimental example 7, in which the raw material contained the metal alone. The reason for this is presumably as follows: For example, Zn has a low melting point of about 420° C. and thus can be partially melted before the completion of the oxidation and the synthesis reaction. The resulting molten portions can be ultimately formed into pores, thereby reducing the electrical conductivity. In contrast, when the Zn compound is used, such pores are not formed. Thus, as the electrically conductive oxide raw material, it was found that the raw material containing a metal that contains a metal element contained in a spinel-type ferrite and a compound that contains a metal element contained in a spinel-type ferrite was more preferred.

Let us discuss the Zn/Fe ratio. At a Zn/Fe ratio of 0.25 or more and 0.5 or less, the joining strength after the thermal cycle was rated as A. At a Zn/Fe ratio of 0.1 or more and less than 0.25, the joining strength after the thermal cycle was rated as B. At a Zn/Fe ratio of 0.1 or more and 0.4 or less, the joined body after the thermal cycle had an electrical conductivity of 1×10$^{-4}$ S/cm or more. At a Zn/Fe ratio more than 0.4 and 0.5 or less, the joined body after the thermal cycle had an electrical conductivity less than 1×10$^{-4}$ S/cm. Thus, it was found that a Zn/Fe ratio of 0.25 or more and 0.5 or less was preferred from the viewpoint of increasing the joining strength and that a Zn/Fe ratio of 0.1 or more and 0.4 or less was preferred from the viewpoint of increasing the electrical conductivity. Furthermore, it was found that in order to further increase both of the joining strength and the electrical conductivity, a Zn/Fe ratio of 0.25 or more and 0.4 or less was more preferred.

Let us discuss the thermal expansion coefficient of the joining portion. It was found that as described in Experimental examples 1 to 4, at a thermal expansion coefficient of 10.0 ppm/K or less, the joining strength was not changed before and after the thermal cycle, the thermal cycle resistance was better. It was also found that as described in Experimental examples 3 to 6, at a thermal expansion coefficient of 9.5 ppm/K or more, the electrical conductivities before and after the thermal cycle were better.

Let us discuss the first member and the second member. In Experimental examples 3 and 9, in which types of the first members and the second members were different from each other, substantially the same results were obtained. It was thus speculated that in the case of the first member having a thermal expansion coefficient of 8 ppm/K or less and the second member having a thermal expansion coefficient of 12 ppm/K or more, the material is not particularly limited.

The joining portion is required to have, for example, characteristics as described below. (1) The joining portion has good joinability to both of the first member and the second member. (2) The joining portion does not react with the first member or the second member. Even if the joining portion reacts with the first member or the second member, no reaction phase that significantly reduces the joinability or the electrical conductivity is formed. (3) The joining portion has high electrical conductivity. (4) The joining portion is stable in air at room temperature to about 800° C. (5) The joining portion has an intermediate thermal expansion coefficient between those of the first member and the second member and relieves thermal stress generated in the joined body.

ZnFe$_2$O$_4$ used in Experimental examples 1 to 9 satisfies all requirements (1) to (5) described above. The reason for good joinability is presumably as follows: At an interface with SUS, a component in SUS (for example, Mn) diffuses. At an interface with Si-bonded SiC, a Si component in Si-bonded SiC diffuses. At each of the interfaces, the joining is accomplished with the composition continuously changed. A good affinity between the materials that do not form a reaction phase having, for example, a significantly different thermal expansion coefficient at each interface seemingly results in better joinability. In particular, in the case where Fe and ZnO were used as the raw material of the joining portion, the joining strength was presumed to be maintained by the fact that the volume expansion of Fe due to oxidation allowed the joining material to penetrate into the pores of the porous material composed of Si-bonded SiC to provide a mechanical fit.

It was found that $ZnFe_2O_4$ had high electrical conductivity and that the electrical conductivity could be controlled by changing the Zn/Fe ratio of $ZnFe_2O_4$. It was also found that $ZnFe_2O_4$ had a thermal expansion coefficient of 9.0 ppm/K and that, for example, in the case where SUS304 (12 ppm/K) was used for the metal member and where Si-bonded SiC (4.6 ppm/K) was used for the ceramic member, an intermediate thermal expansion coefficient was provided, so that the thermal stress was relieved.

The present application claims priority from Japanese Patent Application No. 2015-057671 filed on Mar. 20, 2015, the entire contents of which are incorporated herein by reference.

What is claimed is:

1. A joined body comprising:
   a first member having a thermal expansion coefficient of 8 ppm/K or less;
   a second member having a thermal expansion coefficient of 12 ppm/K or more; and
   a joining portion composed of an electrically conductive oxide containing 50% by mass or more of a spinel ferrite phase, the joining portion joining the first member and the second member,
   wherein the electrically conductive oxide contains Fe and element A, and element A resents one or more elements selected from the group consisting of Mg, Mn, Co, Ni, Cu, and Zn,
   wherein in the electrically conductive oxide, the molar ratio of element A to Fe, is 0.25 or more and 0.4 or less, and
   wherein the joining portion has a thermal expansion coefficient of 8 ppm/K or more and 12 ppm/K or less.

2. The joined body according to claim 1, wherein the electrically conductive oxide contains one or more spinel ferrite phases selected from the group consisting of $ZnFe_2O_4$, $CuFe_2O_4$, and $MnFe_2O_4$.

3. The joined body according to claim 1, wherein the joining portion has an electrical conductivity of $1.0 \times 10^{-6}$ S/cm or more.

4. The joined body according to claim 1, wherein the first member is composed of a ceramic containing Si, and the second member is composed of an alloy containing Fe.

5. The joined body according to claim 1, wherein the joined body has a joining strength of 3.0 MPa or more.

6. The joined body according to claim 1, wherein at least one of part of a surface of the first member adjacent to the joining portion is exposed and part of a surface of the joining portion adjacent to the second member is exposed.

7. A honeycomb structure comprising the joined body according to claim 1.

8. A method for producing a joined body, comprising a step of:
   firing a laminate to form a joining portion, the laminate including a first member having a thermal expansion coefficient of 8 ppm/K or less, a second member having a thermal expansion coefficient of 12 ppm/K or more, and an electrically conductive oxide raw material arranged between the first member and the second member, the joining portion being composed of an electrically conductive oxide containing 50% by mass or more of a spinel ferrite phase, and the joining portion joining the first member and the second member,
   wherein the electrically conductive oxide contains Fe and element A, and element A represents one or more elements selected from the group consisting of Mg, Mn, Co, Ni, Cu, and Zn,
   wherein n the electrically conductive oxide, the molar ratio of element to Fe, is 0.25 or more and 0.4 or less, and
   wherein the joining portion has a thermal expansion coefficient of 8 ppm/K or more and 12 ppm/K or less.

9. The method for producing a joined body according to claim 8, wherein the electrically conductive oxide raw material contains a metal powder and a compound powder.

10. The method for producing a joined body according to claim 9, wherein the compound powder is one or more selected from the group consisting of oxide powders, carbonate powders, hydroxide powders, and chloride powders.

* * * * *